(12) United States Patent
Mochizuki

(10) Patent No.: US 7,410,267 B2
(45) Date of Patent: Aug. 12, 2008

(54) METHOD FOR MANUFACTURING A VEHICULAR LAMP AND A VEHICULAR LAMP

(75) Inventor: Mitsuyuki Mochizuki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 177 days.

(21) Appl. No.: 11/405,177

(22) Filed: Apr. 17, 2006

(65) Prior Publication Data

US 2006/0232972 A1 Oct. 19, 2006

(30) Foreign Application Priority Data

Apr. 19, 2005 (JP) .............................. 2005-121173

(51) Int. Cl.
*F21V 33/00* (2006.01)

(52) U.S. Cl. .................. 362/92; 362/253; 362/267; 362/520; 362/335; 219/202; 219/203

(58) Field of Classification Search .................. 362/92, 362/267, 253, 326, 335, 520, 546; 219/202, 219/203
See application file for complete search history.

(56) References Cited

U.S. PATENT DOCUMENTS

| | | | | |
|---|---|---|---|---|
| 4,728,775 | A | * | 3/1988 | Van Straten .................. 219/202 |
| 6,088,230 | A | | 7/2000 | Finn et al. |
| 6,563,086 | B1 | * | 5/2003 | Meirndorf et al. ............ 219/202 |
| 6,601,983 | B1 | * | 8/2003 | Runfola et al. ............... 362/545 |

FOREIGN PATENT DOCUMENTS

JP 10-109587 4/1998

* cited by examiner

*Primary Examiner*—Stephen F Husar
(74) *Attorney, Agent, or Firm*—William L. Androlia; H. Henry Koda

(57) ABSTRACT

A method for manufacturing a vehicular lamp including a wire installation process that installs a wire (hearing wire) 6 in a flat resin plate 7 by heat; a shape-forming process that forms the resin plate 7 into a predetermined curved shape; a trimming process that trims the resin plate formed in the predetermined curved shape into a desired shape of the exterior contour of a front lens 3; and a fixing process that fixes the front lens to a lamp body 2 by optical welding.

7 Claims, 6 Drawing Sheets

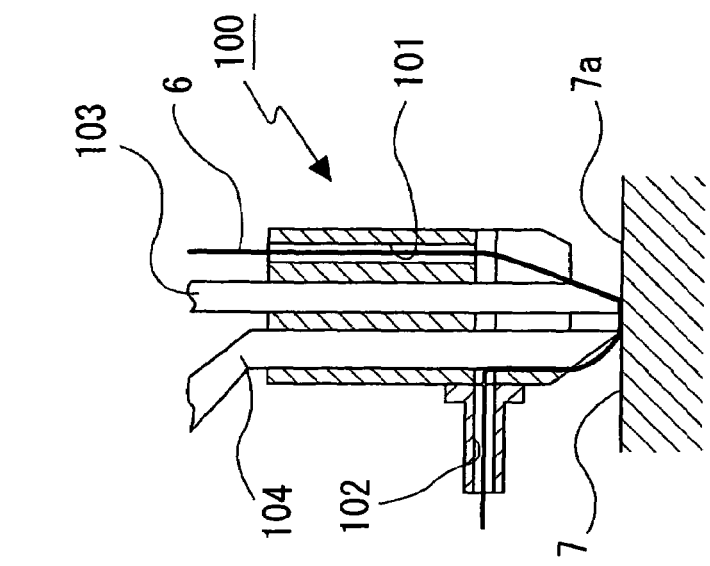
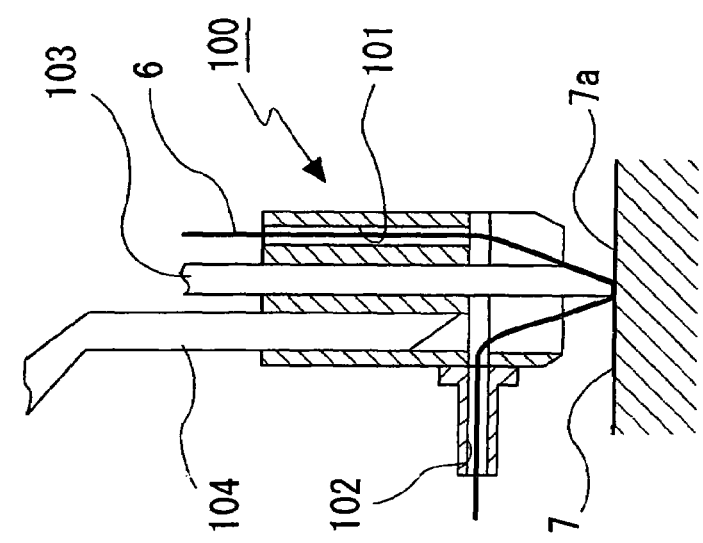
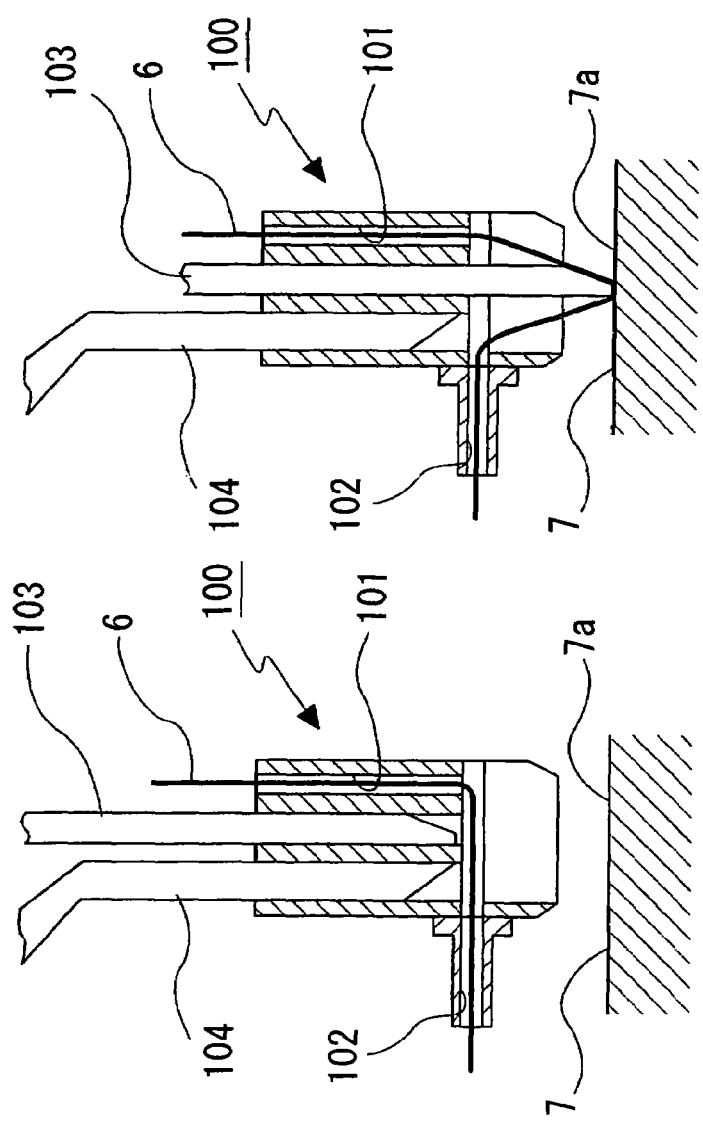

METHOD FOR MANUFACTURING A VEHICULAR LAMP AND A VEHICULAR LAMP

BACKGROUND OF THE INVENTION

1. Field of the Invention

The present invention relates to a vehicular lamp manufacturing method and to a vehicular lamp and more particularly to a method for manufacturing a vehicular lamp that has a heating wire therein and to such a vehicular lamp.

2. Description of the Related Art

In some vehicular lamps, a wire is installed in the front lens so that the wire is electrically heated for the purpose of defrosting the front lens and melting snow on the front lens.

The front lens of a vehicular lamp generally includes an emission surface portion that emits light from the light source and a flange portion that projects from the outer peripheral portion of the emission surface portion toward a substantially perpendicular direction and is attached to a lamp body; and the flange portion projects out from the perimeter of the outer peripheral portion of the emission surface portion so that the front lens is connected or fixed to the lamp body by such a method as vibration welding and hot plate welding or by a sealing material.

However, the flange portion formed along the perimeter of the outer peripheral portion of the light emission surface portion would interfere with the installation work of the heating wire. In other words, during the wire installation operation that uses a wire installation head for installing a wire (heating wire) in the light emission surface portion, the flange portion of the front lens obstructs the movement of the wire installation head.

Furthermore, due to the flange portion, the shape of the front lens is complicated; and since it is necessary to form the front lens by injection molding in which a melted resin is injected into a molding die, the manufacturing costs tend to be high, and the manufacturing time for the front lens tends to be longer.

BRIEF SUMMARY OF THE INVENTION

Accordingly, it is an object of the present invention to provide a method for manufacturing a vehicular lamp and a vehicular lamp manufactured thereby in which the vehicular lamp provided with a heater (or heating wire) is manufactured easily.

The above object is accomplished by unique steps of the present invention for a method for manufacturing a vehicular lamp; and in the present invention, the steps of the manufacturing method includes: a wire installation process that installs a wire in a resin plate of a flat shape by heat; a shape-forming process that forms the resin plate into a predetermined curved shape; a trimming process that trims the resin plate in the predetermined curved shape into a desired shape to form the front lens; and a fixing process that mounts the front lens to a lamp body by optical welding.

The above object is further accomplished by a unique structure of the present invention for a vehicular lamp that is comprised of a front lens and a lamp body; and in the present invention, the front lens is comprised of a resin plate that is thermally installed with a wire (heating wire), formed into a predetermined curved shape, and then trimmed into a desired shape of a front lens outer contour; and this front lens is fixed to the lamp body by optical welding.

As seen from the above, in the vehicular lamp manufacturing method and vehicular lamp of the present invention, the front lens is formed from a flat resin plate which is installed in advance with a wire (heating wire) and is formed into a desired shape.

More specifically, the vehicular lamp manufacturing method of the present invention is a method for manufacturing a vehicular lamp in which the front lens is provided with a wire for heating the front lens, and in the present invention, the method is characterized in that it includes a wire installation process in which a wire (heating wire) is installed in a resin plate of a flat shape by heat; a shape-forming process in which the resin plate is formed into a predetermined curved shape; a trimming process in which the resin plate in the predetermined shape is trimmed into a desired shape to make the front lens; and a fixing process in which the front lens is fixed to a lamp body by optical welding.

Accordingly, since the front lens has no flange portion, the movement of a wire installation head for performing the wire installation operation is not obstructed during the wire installation operation. Accordingly, it is possible to easily manufacture the vehicular lamp.

In the present invention, ultrasonic wire installation is employed for installing the heating wire in the resin plate. More specifically, in the present invention, the resin plate is subjected to ultrasonic vibration so as to be heated and melted, thus allowing at least a portion of the heating wire to be embedded in the resin plate. With the use of ultrasonic wire installation, the apparatus for thermally installing the heating wire in the resin plate can be simple in structure and the operation time of such apparatus can be shortened.

Furthermore, in the present invention, the heating wire is installed so that it comprises a plurality of vertical wire portions that extend in the vertical direction of the resin plate and a plurality of connecting portions that connect respective ends of adjacent vertical wire portions, and the length of (each one of) the vertical wire portions is set to be longer than the length of (each one of) the connecting portions. With this arrangement, light of the lamp is much less apt to diffuse vertically, and it is thus possibled to reduce the generation of glare light.

In addition, in the present invention, the resin plate is preferably 2 mm to 4 mm in thickness. Accordingly, no deformation of the resin plate due to the pressure from the wire installation head occurs during the wire installation operation; and thus, the wire installation operation can be appropriately achieved with ease.

Furthermore, the vehicular lamp of the present invention is a vehicular lamp in which the front lens is provided with a wire for heating the front lens, and the vehicular lamp of the present invention is characterized in that the front lens is formed by forming a flat resin plate, which is theremally installed with a wire (heating wire), into a predetermined curved shape and then trimming is done for the resin plate so that the resin plate is formed into a desired shape of front lens; and this front lens is fixed to a lamp body by optical welding.

Accordingly, in the vehicular lamp of the present invention, the lamp is obtained such that the wire installation head that performs wire installation is not obstructed by a flange portion of the front lens since the front lens has no flange portion, and the lamp is manufactured easily.

BRIEF DESCRIPTION OF THE SEVERAL VIEWS OF THE DRAWINGS

FIGS. 4A through 4C show the procedure of installing the wire (heating wire) in the resin plate by heat, wherein FIG. 4A shows a standby state prior to the installation of the wire, FIG. 4B shows the wire installation state, and FIG. 4C shows the state that the wire installation is completed;

DETAILED DESCRIPTION OF THE INVENTION

The preferred embodiments of the vehicular lamp manufacturing method and of the vehicular lamp according to the present invention will be described below with reference to the accompanying drawings.

Figure 1:
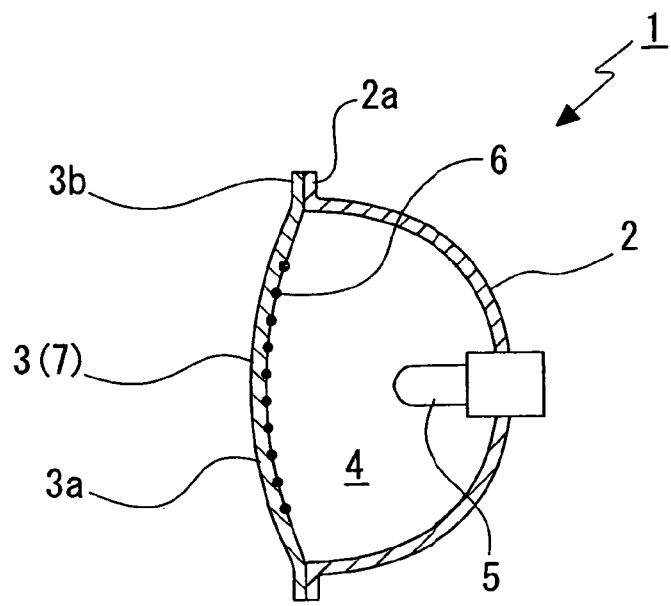
FIG. 1 is a cross-sectional view of the vehicular lamp according to the present invention.
Figure 2:
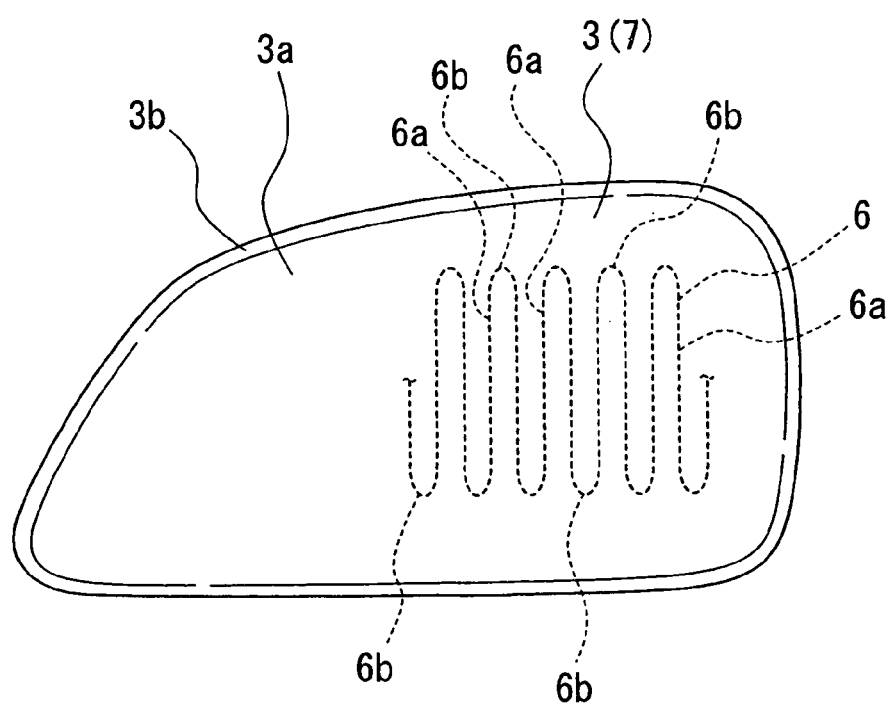
FIG. 2 is a front elevational view thereof.
Figure 3:
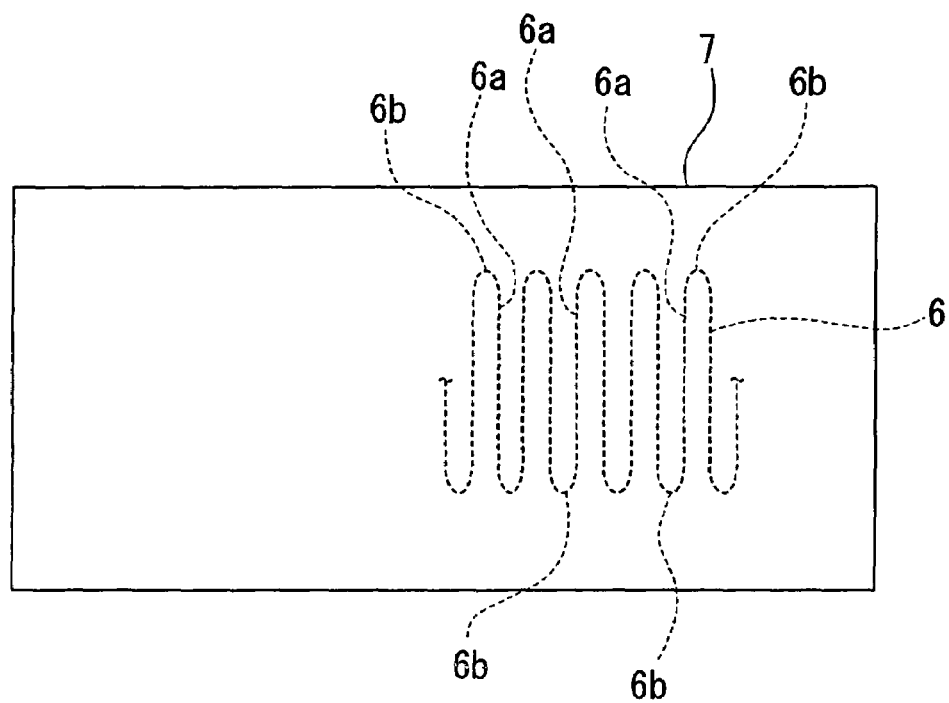
FIG. 3 is a conceptual diagram showing the state in which a resin plate is installed with a wire before being molded.

FIGS. 1 and 2 schematically show an example of the vehicular lamp manufactured according to the vehicular lamp manufacturing method of the present invention.

The vehicular lamp 1 is, for example, a front lamp for an automobile, and it includes a lamp body 2 with a concave portion open in the front, and a front lens 3 that closes the front opening of the lamp body 2. The internal space defined by the lamp body 2 and the front lens 3 makes a lamp chamber 4. Attached to the lamp body 2 is a light source bulb 5 that is disposed inside the lamp chamber 4. The light source bulb 5 is, for example, a discharge bulb, but a light source other than the discharge bulb including an incandescent bulb such as a halogen bulb, or a light-emitting diode and the like can be used.

Provided on the end portion on the open side of the lamp body 2 is a fixing portion 2a which is a flange shape and extends outward.

The front lens 3 is comprised of a light emission surface portion 3a that emits light from the light source bulb 5 substantially forward and an optical welding portion 3b that projects outwardly from the outer peripheral portion of the light emission surface portion 3a. The emission surface portion 3a is formed in, for example, a gently curving shape, and the optical welding portion 3b is formed flat.

A wire (heating wire) 6 such as copper wire that can be electrically heated is embedded in and fixed to the inner surface side of the light emission surface portion 3a of the front lens 3. As shown in FIG. 2, the wire 6 comprises a plurality of vertical wire portions 6a that extend in the vertical direction (an up-down direction) of the front lens 3 and a plurality of connecting portions 6b that connect the respective ends of adjacent vertical wire portions 6a. The length of (each one of) the vertical wire portions 6a is set longer than the length of (each one of) the connecting portions 6b.

The diameter of the wire 6 is preferably 0.05 mm to 0.2 mm. If the wire diameter is too small (or smaller than 0.05 mm), the risk of short-circuiting increases. If the wire diameter is too large (or larger than 0.2 mm), then light rays passing through the front lens 3 may be blocked, adversely affecting the light distribution of the lamp 1 and making the wire 6 conspicuous, worsening the appearance of the front lens 3.

The space between adjacent vertical wire portions 6a of the wire 6 may be in the range from 5 mm to 25 mm. If the space between the vertical wire portions 6a is too small, light distribution is greatly affected; and if the wire space is too large, then a desired heat amount is unable to obtain.

In the vehicular lamp 1 as described above, when the electric current flows in the wire 6 installed in the front lens 3, the wire 6 is heated, increasing the temperature for the portion of the front lens 3 where the wire 6 is provided. As a result, the generated heat melts snow on the surface of the front lens 3 and defrosts the inside and outside of the front lens 3.

The manufacturing method of the front lens 3 will be described below with reference to FIGS. 3 to 9.

A resin plate 7 that is transparent and has a flat shape is first prepared. The resin plate 7 is in, for example, a rectangular shape, and it is generally formed from material such as polycarbonate or acryl resin that is used as the material for the front lens. The thickness of the resin plate 7 is preferably 2 mm to 4 mm.

Next, the wire (heating wire) 6 is installed by heat or thermally installed in the resin plate 7 (a wire installation process). The thermal installation is an operation in which heat is applied to a substrate (the resin plate 7 in the present invention), in which the wire 6 is to be installed, so as to heat and soften the substrate (the resin plate 7), after which the wire 6 is pressed into heated and softened locations of the substrate such that the wire 6 is as least partially embedded in the substrate (the resin plate 7). Means for heating the substrate include, for example, applying the ultrasonic vibration to the substrate or pressing a heated pressing member against the substrate.

Wire installation by heat or thermal wire installation is performed using, for example, a wire installation head as described in Japanese Patent No. 3190345.

In the standby state as shown in FIG. 4A, the wire 6 is first inserted into the guide portions 101 and 102 of a wire installation head 100 so that the wire 6 is inside a generally L-shaped route.

In the next step, as shown in FIG. 4B, a pressing arm 103 is projected out. Upon projection of the pressing arm 103, the wire 6 is pushed by the tip of the pressing arm 103 and pushed out of the guide portion 102, and the wire 6 is pressed onto the wire-installation surface 7a of the resin plate 7 by the tip end of the pressing arm 103.

Next, the tip portion of the pressing arm 103 is heated, or an ultrasonic vibration is applied to the pressing arm 103. Once the tip of the pressing arm 103 is heated, or ultrasonic vibration is applied to the pressing arm 103, the portion of the resin plate 7 with the wire 6 being pressed thereon is heated and softened. As a result, with a predetermined pressure applied to the pressing arm 103 toward the resin plate 7, the wire 6 is pressed by the pressing arm 103 and is subsequently softened by the heating and pushed into the resin plate 7 (see FIG. 5).

As seen from the above, the pressing arm 103 is heated or subjected to ultrasonic vibration; and in this state, the predetermined pressure is applied toward the resin plate 7, and the wire installation head 100 is moved along a predetermined route. As a result, the wire 6 is embedded in the resin plate 7 at a predetermined position and in a predetermined pattern.

When the wire installation head 100 is moved to a wire installation termination position, the tip of the cutter 104 projects out as shown in FIG. 4C and cuts the wire 6.

In the above-described wire installation, the wire 6 is embedded in the resin plate 7 except two end portions thereof, and the two end portions of the wire 6 not embedded are raised from the resin plate 7 and, as described below, are connected to terminals (not shown).

Following the completion of the installation of the wire 6 by heat in the resin plate 7, the two end portions of the wire 6 are respectively connected to the terminals that have been fixed in advance to the resin plate 7. Connection of the end portions of the wire 6 to the terminals is achieved by winding the two end portions of the wire 6 around the respective terminals and fixing them by welding.

As seen from the above, the wire 6 is installed in any desired pattern by way of moving the wire installation head 100 in a predetermined desired path, and the connection of the two end portions of the wire 6 to the respective terminals are made, thus completing the wire installation.

In the present invention, since the resin plate 7 has the thickness of 2 mm to 4 mm, the resin plate 7 does not deform by the pressure of the wire installation head 100 during the wire installation operation, and thus the wire installation operation is achieved with ease.

Furthermore, since the resin plate 7 has the thickness of 2 mm to 4 mm, it can be ensured that the resin plate 7 has a predetermined strength needed for functioning as the front lens 3; and since the thickness is not excessive, excellent thermal conductivity is secured for the front lens when the wire 6 generates the heat.

The resin plate 7 thus formed is next pre-formed so as to take the shape of the front lens 3 (a shape-forming process).

The pre-forming of the resin plate 7 is performed by a so-called thermoforming, which involves heating and softening the resin plate 7, and subsequently pressing the resin plate 7 against a die by vacuum suction or pneumatic pressure or compressing the resin plate 7 between two dies. For example, the flat resin plate 7 is formed into a curved shape by thermoforming (see FIG. 6).

Figure 7:
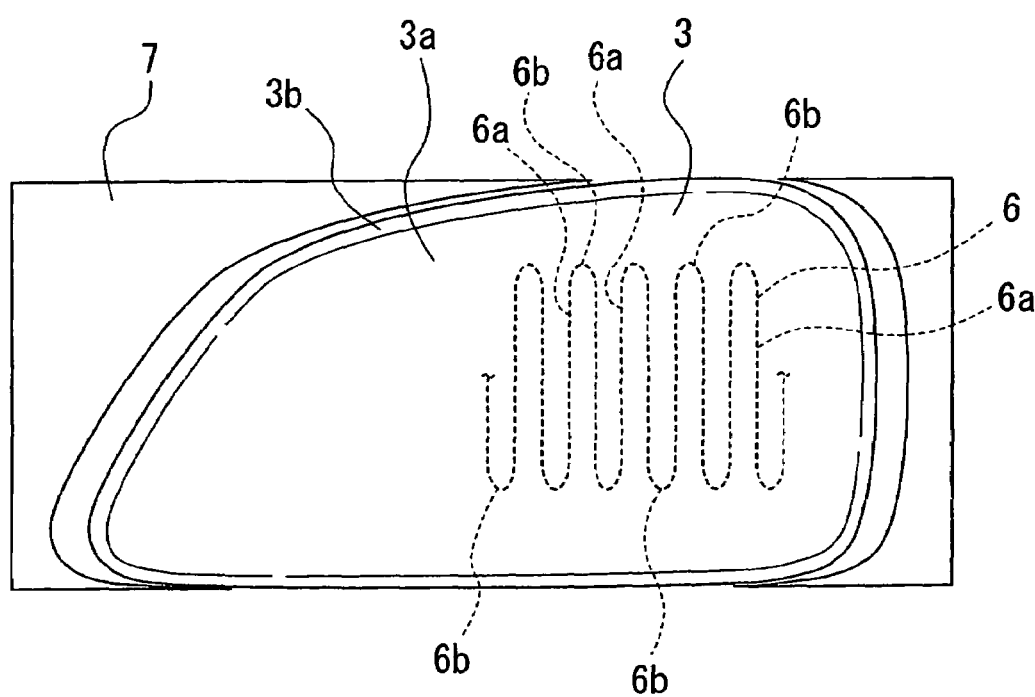
FIG. 7 is a conceptual diagram showing the state in which trimming is performed.

Trimming is next performed on the resin plate 7. In other words, the resin plate 7 embedded with the wire 6 as described above is cut so that it has a desired exterior contour of the front lens 3 as shown in FIG. 7 (a trimming process). A cutting tool such as a cutter is used to perform the trimming. By the trimming, the front lens 3 is formed so that it has the optical welding portion 3b on the outer peripheral portion and so that the portions other than the optical welding portion 3b make the emission surface portion 3a.

Figure 5:
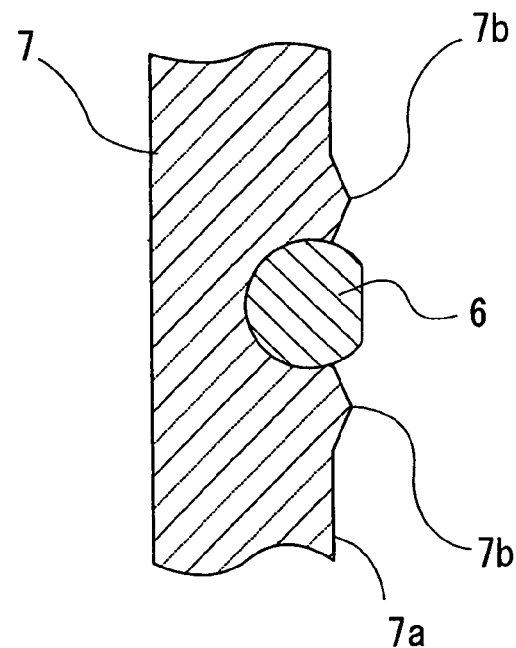
FIG. 5 is an enlarged cross-sectional view of the wire partially embedded in the resin plate by a thermal wire installation.
Figure 6:
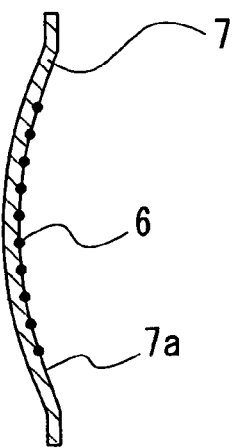
FIG. 6 is a conceptual diagram showing the resin plate that has been pre-formed.

Meanwhile, in the state that the wire 6 is embedded in the resin plate 7 (or in the wire-installation surface 7a) by heat, the wire 6 is, as seen from FIG. 5, only partially embedded in the resin plate 7. Moreover, the material for the resin plate 7, which was pressed during the installation or embedding process of the wire 6, protrudes out in a bank formation along the wire 6, forming bulged bank portions 7b. The distance between the bulged bank portions 7b on both sides of the wire 6 is greater than the diameter of the wire 6; and therefore, the appearance of the resin plate 7 deteriorates. Furthermore, the bulged bank portions 7b would act as prisms for light rays, causing the light distribution to be disrupted due to diffuse reflection or diffuse refraction occurring at the bulged bank portions 7b and the like. Accordingly, in the state that the wire 6 is embedded in the resin plate 7, the bulged bank portions 7b become conspicuous, worsening the appearance of the vehicular lamp 1.

Figure 8:
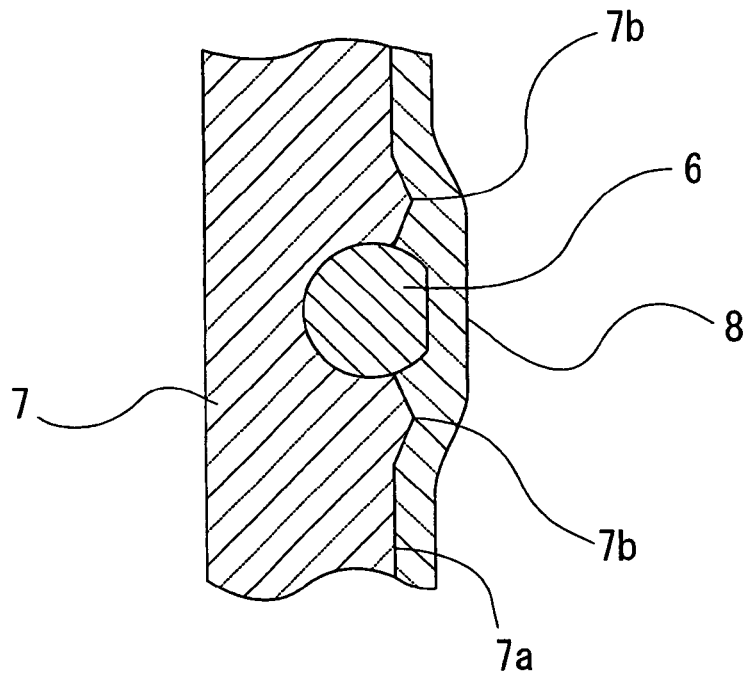
FIG. 8 is an enlarged cross-sectional view of the state in which a coating layer is formed on the front lens.

Accordingly, in the vehicular lamp 1 of the present invention, after installing the wire by the wire installation head 100, the wire-installation surface 7a of the resin plate 7 is coated with a coating layer 8 which is made of transparent resin (see FIG. 8). With the formed coating layer 8, the wire 6 is covered by the coating layer 8 and the surface in which the wire 6 is embedded becomes smoother. Accordingly, the portion other than the wire 6, for example, the swelled bank portions 7b, does not stand out and the appearance of the vehicular lamp 1 is improved.

The coating layer 8 is preferably formed by a resin that has a refractive index similar to the material for the front lens 3. As a result, the swelled bank portions 7b lessen the light refraction and provide less adverse effects to the light distribution of the lamp 1.

With the coating layer 8 covering the wire 6, separation of the wire 6 from the front lens 3 is prevented. Furthermore, since the wire 6 is not exposed to air, it is possible to prevent changes in its resistance value, discoloration, and deterioration due to the oxidation, etc. of the wire 6.

The front lens 3 manufactured as described above is next mounted in the lamp body 2, and the terminals connected to the wire 6 are connected to a power source via connectors (not shown) so that the wire 6 is brought into a state capable of being supplied with electricity.

Figure 9:
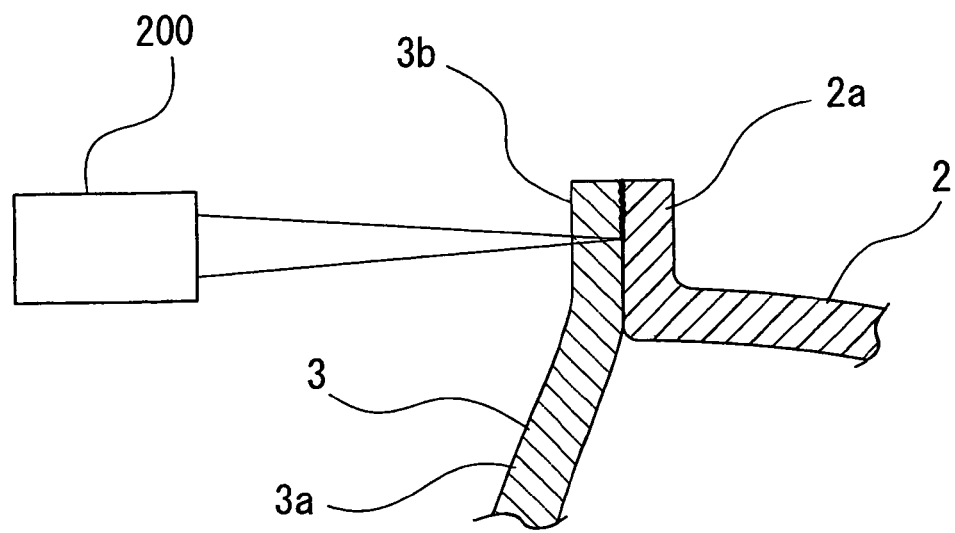
FIG. 9 is a conceptual diagram showing the state in which optical welding is performed.

Lastly, the optical welding portion 3b of the front lens 3 is fixed to the fixing portion 2a of the lamp body 2 by optical welding (a fixing process). For optical welding, laser welding that radiates laser light from a welding device 200 as shown in FIG. 9 is used. More specifically, laser welding is performed by putting the optical welding portion 3b of the front lens 3 in contact with the fixing portion 2a of the lamp body 2, and then allowing the laser light to pass through the front lens 3, thus melting the portion where the optical welding portion 3b and the fixing portion 2a are in contact. By such laser welding, the front lens 3 is fixed to the lamp body 2 to form the vehicular lamp 1. Since the laser welding is performed by the method described above, there is no need to provide a flange portion on the front lens that is required in other joining methods such as hot plate welding, and the entire perimeter of the front lens 3 is assuredly joined to the lamp body 2.

As seen from the above, in the vehicular lamp 1 of the present invention, the front lens 3 is formed by forming a flat resin plate which is thermally installed with a wire 6 into a predetermined shape and then trimming the resin plate 7 into a desired curved shape front lens 3, and this front lens 3 and a lamp body 2 are joined by laser welding. Accordingly, the front lens 3 has no flange portion that projects generally rearward for fixing the front lens 3 to a lamp body, and thus the wire installation operation of the wire 6 done by moving the wire installation head 100 is not obstructed. Accordingly, it is possible to easily manufacture the vehicular lamp 1.

In addition, since there is no need to form the front lens 3 by injection molding in which a melted resin is injected into a molding die, it is possible to lower the manufacturing costs of the vehicular lamp 1 and shorten the manufacturing time of the vehicular lamp 1.

Furthermore, since the ultrasonic wire installation is used for thermally installing the wire 6, the resin plate 7 is subjected to ultrasonic vibration, and it is heated and melted such that at least a portion of the wire 6 is embedded in the resin plate 7. This makes the apparatus for thermally installing the wire simpler in structure and the operation time of such apparatus shorter.

Furthermore, since the length of (each one of) the vertical wire portions 6a of the wire 6 is set longer than the length of (each one of) the connecting portions 6b, light is much less apt to diffuse vertically, thus reducing the generation of glare light.

In the above description, laser welding is employed for executing the optical welding, in which the laser light is coherent light. However, optical welding is not particularly limited to the laser welding alone. Various types of optical welding that use non-coherent light or coherent light such as visible light, ultraviolet light, infrared light and the like can be used in the present invention. The appropriate type of light is selected depending on the material of the front lens 3, which is a member through which the light passes, and the material of the lamp body 2, which is irradiated by the light to form an excitation state.

The shapes and configurations of the respective portions described and shown in the above embodiments are all merely one specific example for carrying out the present invention, and they must not be interpreted to limit the technical scope of the present invention in any manner.

The invention claimed is:

1. A method for manufacturing a vehicular lamp in which a front lens thereof is provided with a wire for heating the front lens, said method comprising the steps of:
   installing a wire in a resin plate of a flat shape by heat;
   forming the resin plate into a predetermined shape;
   trimming the resin plate of the predetermined shape into a desired shape to form the front lens; and
   fixing the front lens to a lamp body by optical welding.

2. The method for manufacturing a vehicular lamp according to claim 1, wherein
   the resin plate is subjected to ultrasonic vibration so as to be heated and melted, thus allowing at least a portion of the wire is embedded in the resin plate.

3. The method for manufacturing a vehicular lamp according to claim 1, wherein
   the wire installed comprises a plurality of vertical wire portions that extend in a vertical direction of the resin plate and a plurality of connecting portions that connect respective ends of adjacent vertical wire portions, and
   a length of the vertical wire portions is set to be longer than a length of the connecting portions.

4. The method for manufacturing a vehicular lamp according to claim 1, wherein
   the resin plate has a thickness of 2 mm to 4 mm.

5. The method for manufacturing a vehicular lamp according to claim 1, further comprising the step of forming a coating layer that covers the wire installed in the resin plate.

6. The vehicular lamp according to claim 1, further comprising a coating layer provided on said resin plate so as to cover said wire installed in said resin plate.

7. A vehicular lamp in which a front lens thereof is provided with a wire for heating the front lens, wherein
   the front lens is comprised of a resin plate, the resin plate being installed with a wire by heat, formed into a predetermined curved shape and then trimmed into a desired front lens outer contour shape; and
   the front lens is fixed to a lamp body by optical welding.

* * * * *